Sept. 8, 1959 G. I. CERVENE 2,903,032
APPARATUS FOR MEASURING AND SEGREGATING SLICED
PRODUCTS FROM SLICING MACHINES
Filed Nov. 6, 1953 7 Sheets-Sheet 1
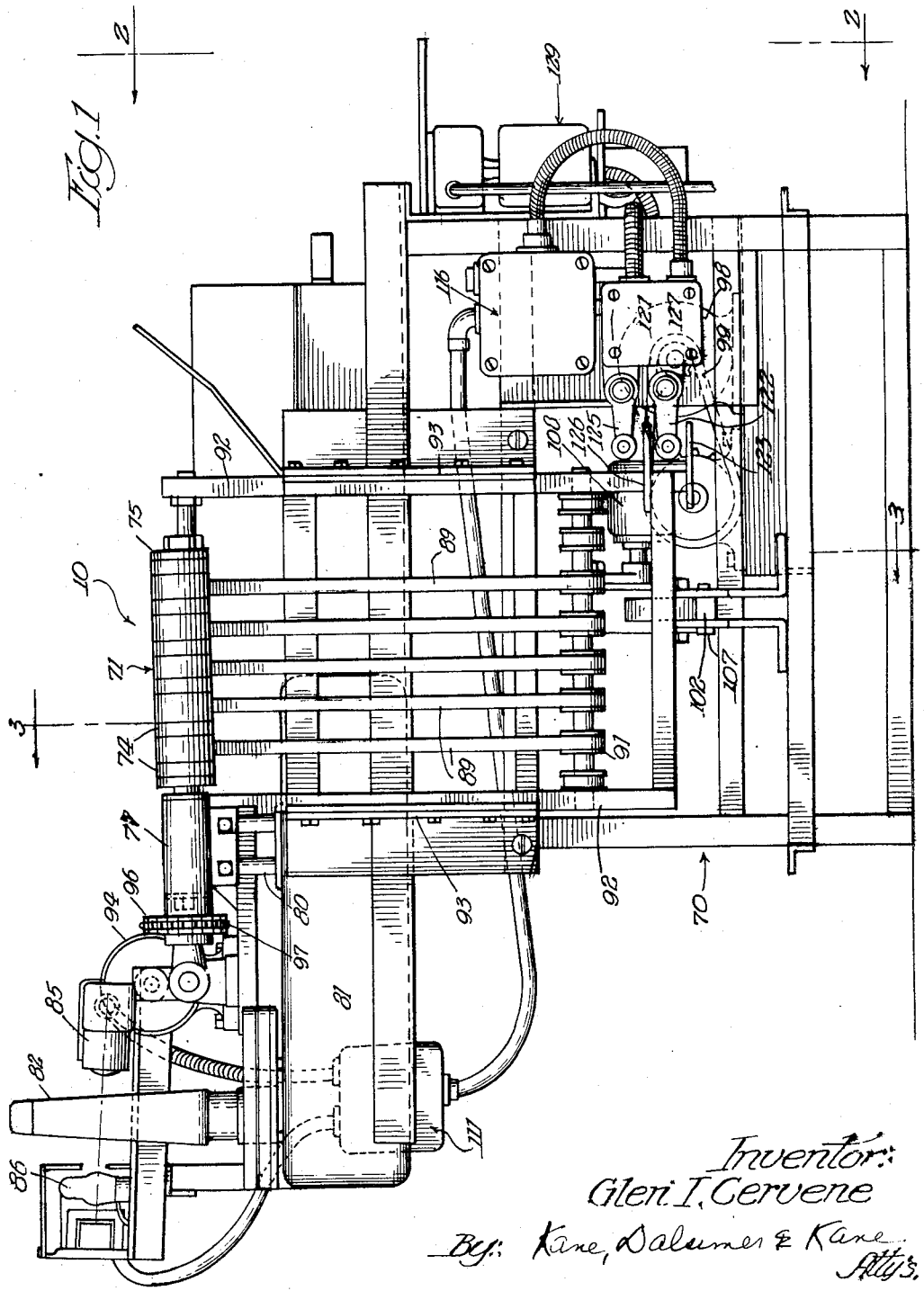
Inventor:
Glen I. Cervene
By: Kane, Dalsimer & Kane
Attys.

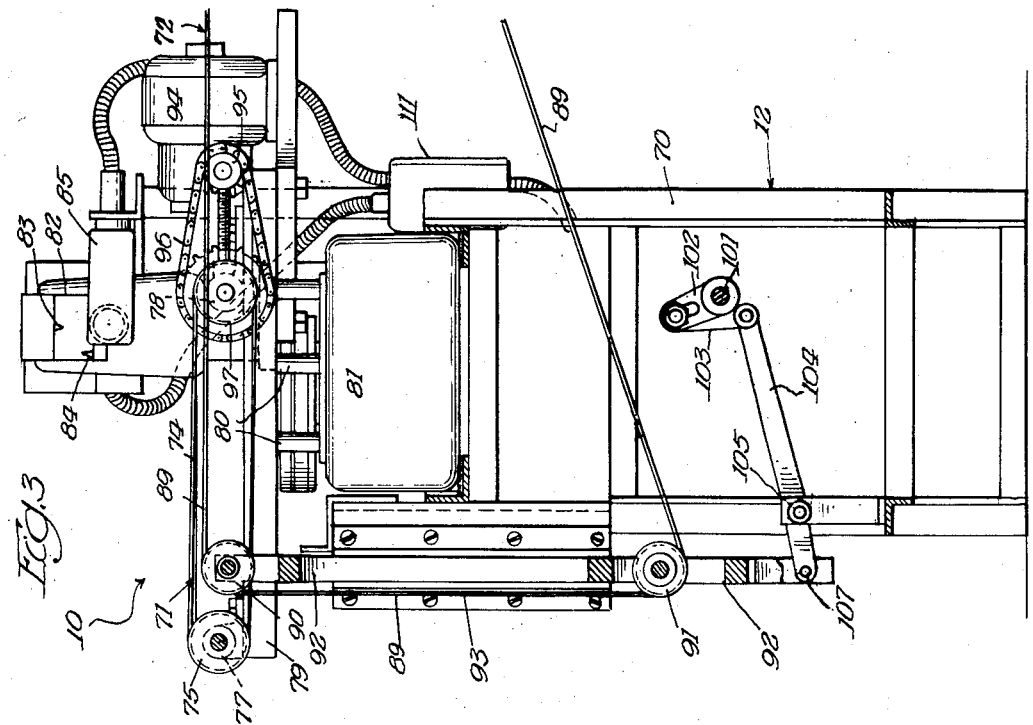

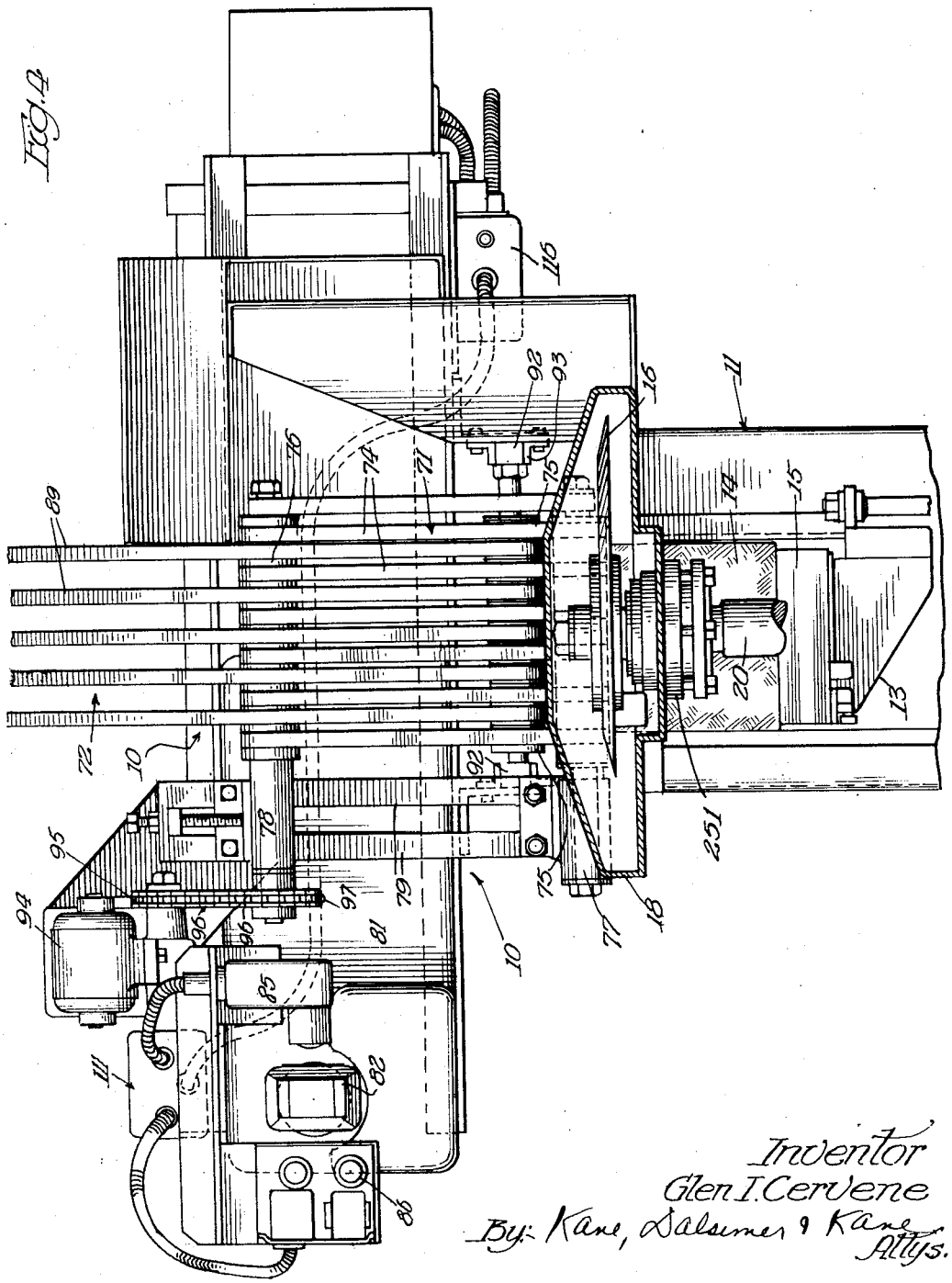

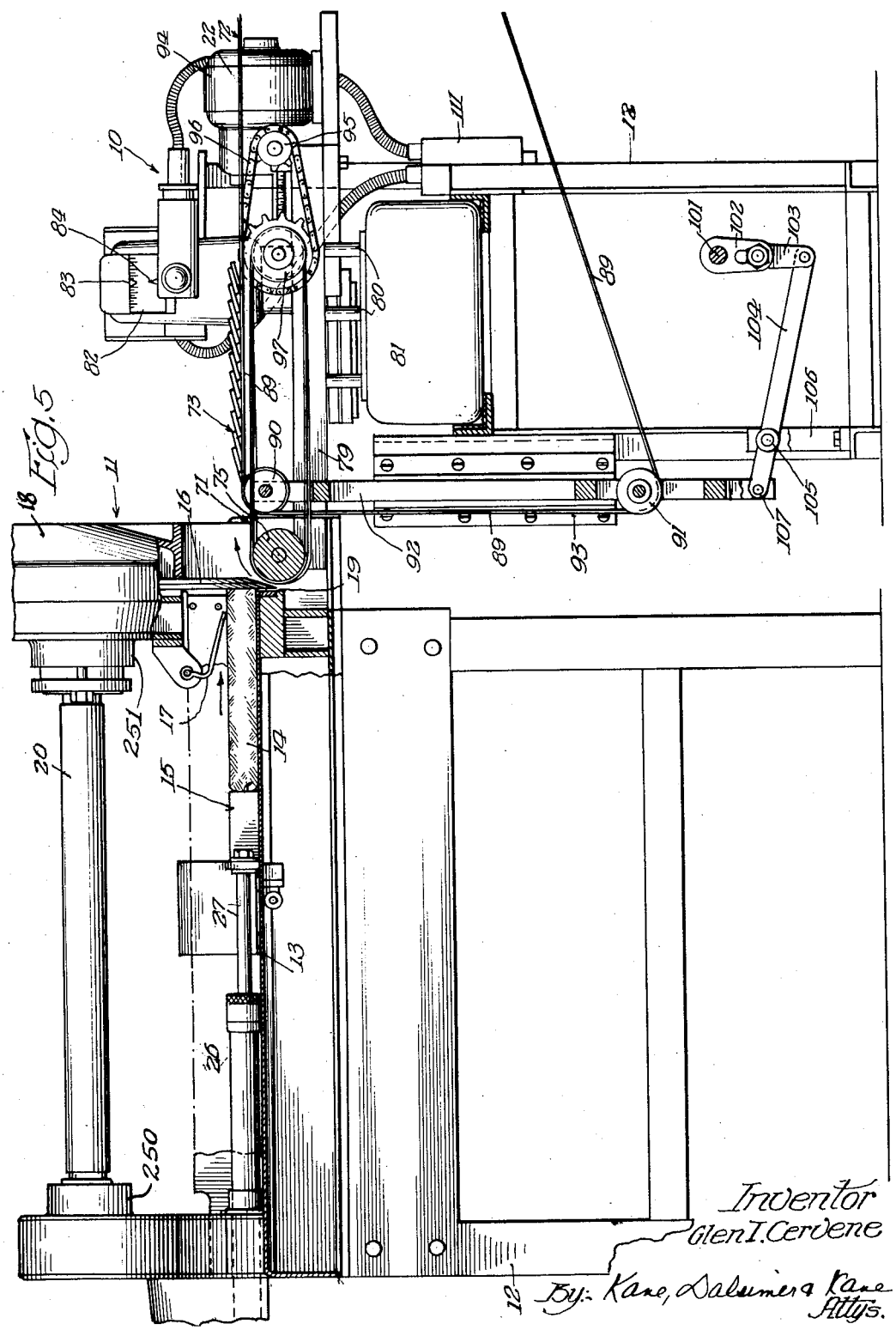

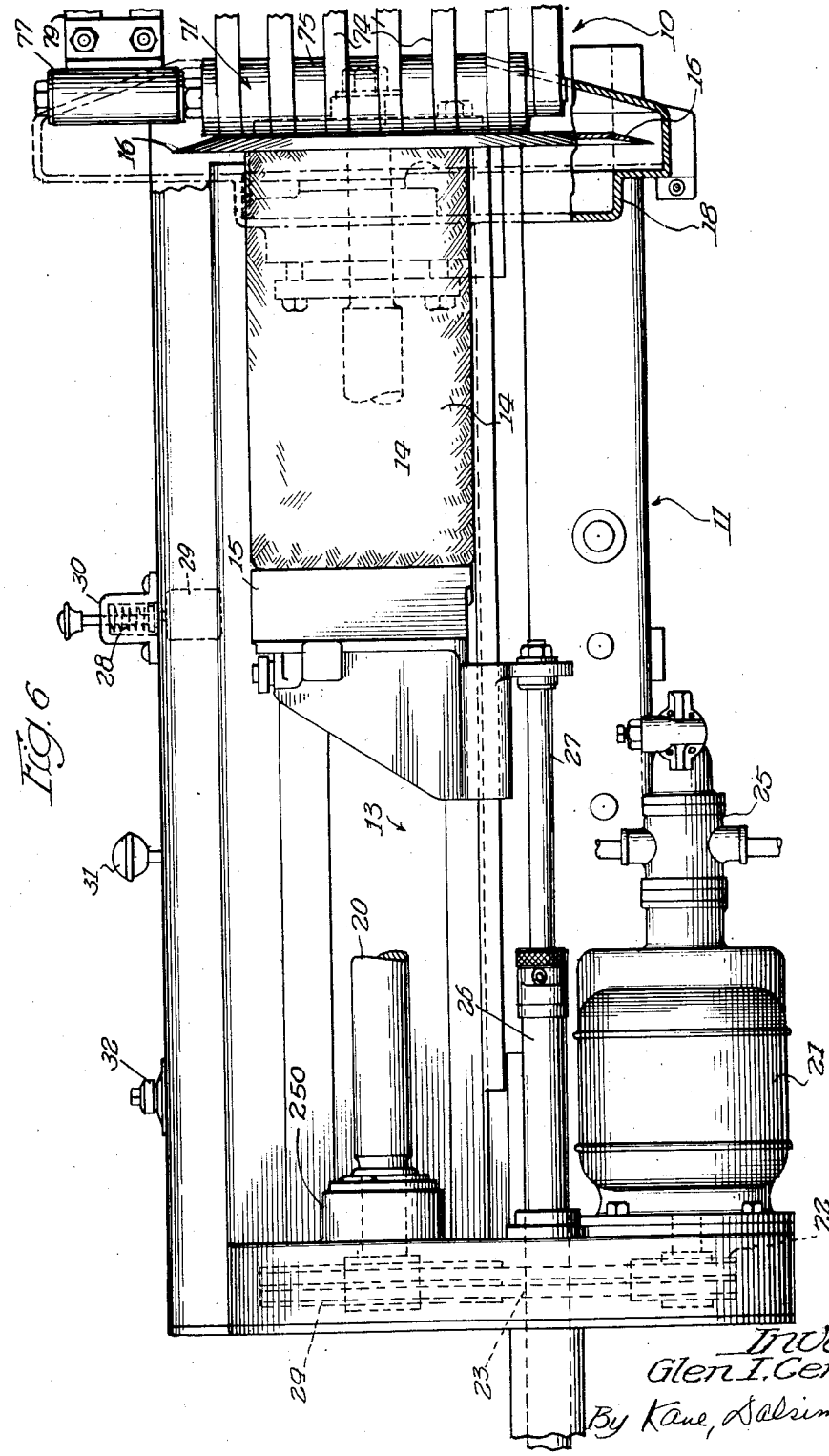

Sept. 8, 1959
G. I. CERVENE
2,903,032
APPARATUS FOR MEASURING AND SEGREGATING SLICED
PRODUCTS FROM SLICING MACHINES
Filed Nov. 6, 1953
7 Sheets-Sheet 6
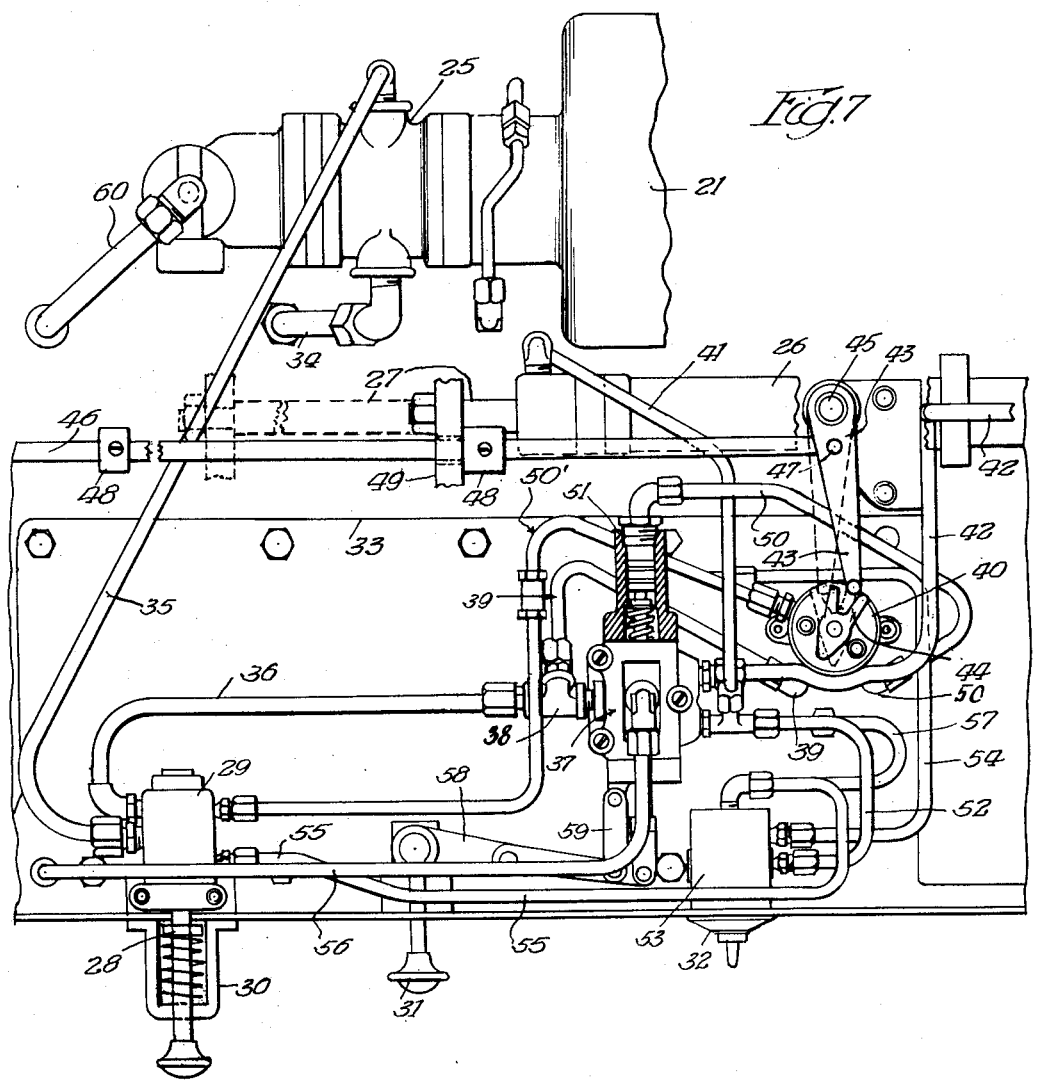
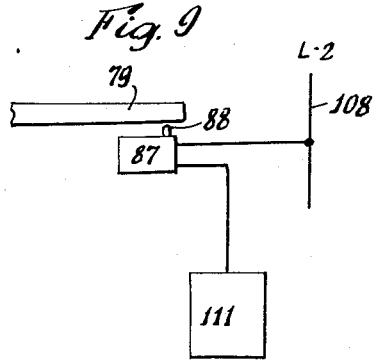
Inventor:
Glen I. Cervene
Kane, Dalsimer & Kane
Attys.

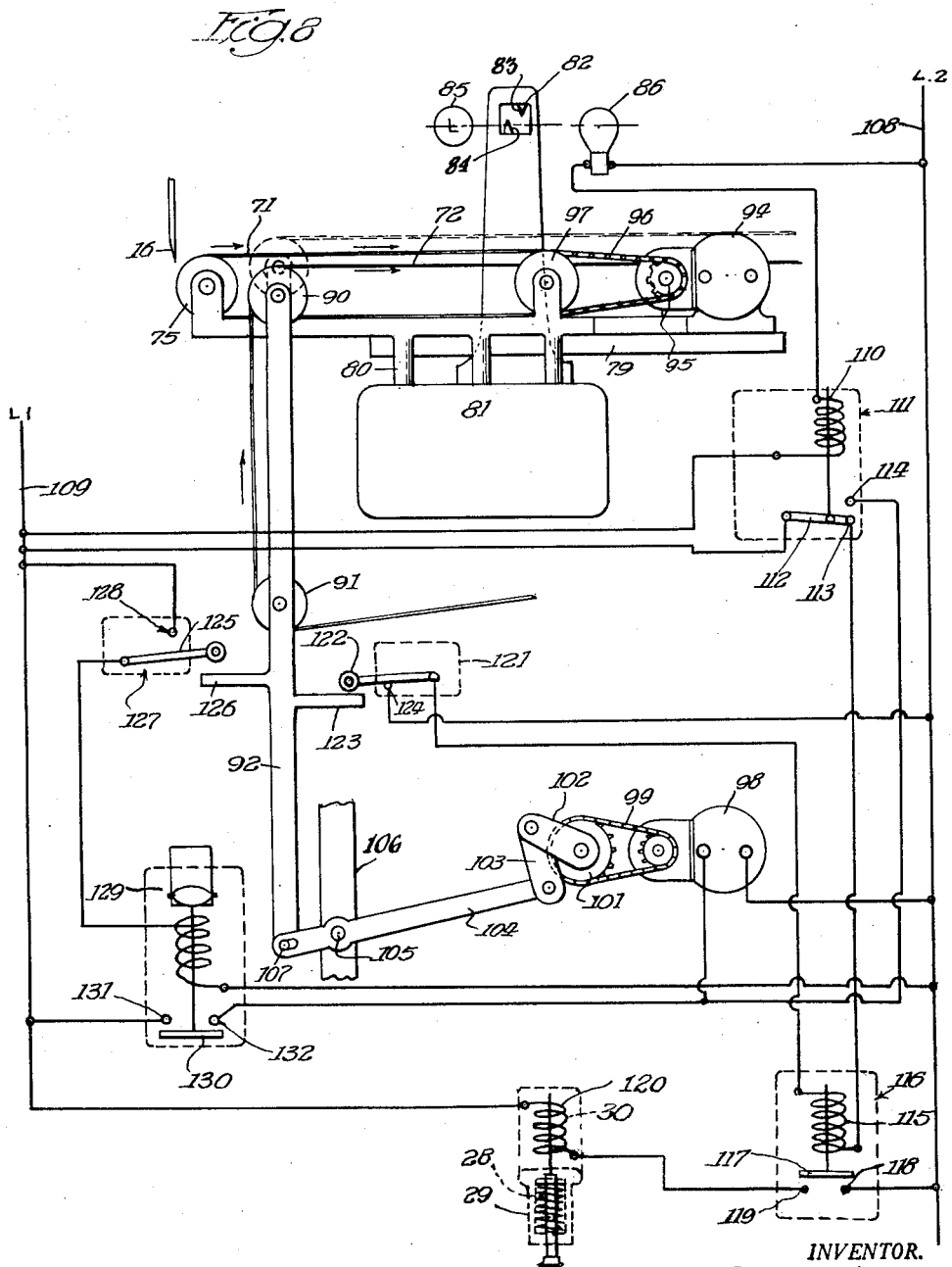

United States Patent Office 2,903,032
Patented Sept. 8, 1959

2,903,032

APPARATUS FOR MEASURING AND SEGREGATING SLICED PRODUCTS FROM SLICING MACHINES

Glen I. Cervene, Fort Dodge, Iowa, assignor, by mesne assignments, to Cashin, Inc., Rochester, N.Y., a corporation of New York Application November 6, 1953, Serial No. 390,575

9 Claims. (Cl. 146—94)

This invention relates to improved apparatus for measuring and segregating predetermined quantities of sliced products coming from a slicing machine.

In the preparation of sliced food products such as sliced bacon and sliced luncheon meats, it has been common practice to operate the slicing machine continuously and to discharge the slices upon a conveyor leading from the machine. A number of operators stationed along the conveyor then segregate the slices, for packaging, into separate measured quantities, usually of pre-selected weight. The weight of each of the segregated quantities must be held within close tolerances and the work of thus accurately measuring and segregating the precise predetermined quantities is tedious and time consuming and, therefore, costly.

In is an object of the present invention to eliminate the time consuming and costly manual operations heretofore required and to provide improved apparatus which will automatically measure and segregate sliced food products coming from a slicing machine.

A further object is the provision of improved apparatus of the above character which can be combined with a slicing machine so as to control or affect the operation thereof. Thus, when the desired predetermined quantity of sliced food products has been measured by the apparatus it will interrupt or control the operation of the slicing machine so as to prevent further slices of the food product from being dispensed into the measured quantity.

Another object is the provision of apparatus of the type heretofore described which is sensitive and accurate so that the measured quantities can be held within close tolerance limits but which nevertheless is of sturdy construction so as to give satisfactory performance under operating conditions for a long period of time with comparative freedom from wear.

My invention contemplates the provision of measuring and segregating apparatus to be assembled with a slicing machine at the discharge end thereof. The apparatus includes a receiving platform and conveyor which are arranged in intermeshed relationship and which normally operate in two different horizontal planes. The receiving platform normally operates in the higher plane and receives the sliced food products from the discharge end of the slicing machine. When a measured quantity of the sliced food product has been deposited upon the receiving platform, the relationship between the conveyors and receiving platform is automatically changed so that the conveyor then occupies the higher horizontal plane carrying the measured quantity of sliced food products with it and segregating the measured quantity from further sliced products to be discharged by the slicing machine.

In the accompanying drawings—

Fig. 1 is an end elevational view taken from the leading end of measuring and segregating apparatus embodying my invention;

Fig. 2 is a side elevational view in the direction of the arrows on the line 2—2 of Fig. 1 with portions of the apparatus omitted for the sake of clarity;

Fig. 3 is a cross-sectional view in the direction of the arrows on the line 3—3 of Fig. 1 showing the conveyor and receiving platform in their normal operating relationship;

Fig. 4 is a top plane view of my apparatus and also shows the discharge end of a slicing machine;

Fig. 5 is a longitudinal sectional view similar to Fig. 3 showing the apparatus assembled with a slicing machine and indicating the arrangement of the conveyor and receiving platform after a predetermined quantity of the sliced food products has been measured and showing it in the process of being segregated from other sliced products to be dispensed by the machine;

Fig. 6 is a plan view partially in section and with portions omitted of a slicing machine with the adjacent portions of my improved apparatus;

Fig. 7 is a detailed, partially diagrammatic view of the hydraulic circuit for actuating the slicing machine;

Fig. 8 is a diagram of the electrical circuits for controlling the operation of the apparatus and showing schematically the associated mechanical parts; and Fig. 9 is a partially diagrammatic view showing a modified form of control switch that may be used in the measuring portion of the apparatus for controlling the electrical circuits.

In the accompanying drawings, I have shown my improved measuring and segregating apparatus 10 applied to the discharge end of a slicing machine 11 so that the sliced products from the slicing machine are discharged on my apparatus and measured, and the measured quantities are then segregated from the other sliced products coming from the slicing machine.

*Slicing machine*

My improved apparatus may be used with many different types of slicing machines. The drawings illustrate one type of slicing machine to which my invention is particularly applicable. It is commercially available under the name Hydra-matic Bacon Slicer and is fully disclosed in the operating instructions for The Anco No. 827 Hydramatic Bacon Slicer (revised May 14, 1952) published by the manufacturer, The Allbright-Nell Co., of Chicago, Illinois.

The bacon slicer is shown more particularly in Figs. 5 to 7 inclusive, and comprises a supporting table 12 having a platen or feed bed 13 over which the product such as the bacon shown at 14 is fed by a pusher 15 to the slicing blade 16 to be sliced and then discharged onto my measuring and segregating apparatus 10. The forward or leading edge of the bacon or other product 14 is pressed downwardly against the bed so as to properly engage the blade for slicing by means of pressure fingers 17 suitably supported adjacent the blade as shown in Fig. 5. The blade is encased in a housing 18 which serves to protect the operator and also to prevent particles of the sliced product from being thrown outwardly from the blade by centrifugal force.

The blade is in the form of an eccentric disk which is rotated at high speed. The portion of the blade having the greatest radius, shown in Fig. 5, will cooperate with the shearing edge 19 of the feed bed 13 to slice the leading edge of the product. The portion of the disk having the minimum radius shown at the left side of Fig. 4 provides clearance for the product to be fed outwardly so as to permit the initiation of the next slicing operation. The product is slowly and continuously fed forwardly and each cycle of rotation of the blade produces another slice. The thickness of the slice can be varied by varying the speed of the pusher 15. Thus, when the pusher feeds the product forwardly at a relatively higher rate of speed the thickness of the slice is increased and when the pusher operates at a relatively lower rate of speed the thickness of the slice is reduced.

The slicing blade is mounted at the end of shaft 20 which is journaled in suitablle supports 250 and 251 near its opposite ends. The shaft is driven by an electric motor 21 through pulley 22, belts 23 and pulley 24.

Motor 21 also operates the hydraulic pump 25 which provides the hydraulic fluid under pressure for the operation of hydraulic cylinder 26. The piston 27 of the hydraulic cylinder causes the reciprocation of the pusher 15 so as to automatically feed the product to be sliced towards the blade and then to automatically retract after the completion of the feed stroke.

When motor 21 is operated, it causes the rotation of slicing blade 16 and also the operation of hydraulic pump 25 so as to generate the necessary hydraulic pressure. Pusher 15 is caused to operate by means of the start-and-stop shaft 28 of control valve 29. When the shaft is pushed inwardly it causes the reciprocation of pusher 15. When it is pulled outwardly it stops the reciprocation of the pusher.

In the conventional slicing machine, the shaft 28, is manually operated. When combined with my improved apparatus for measuring and segregating the sliced products, I prefer to have the operation of the switch controlled automatically by the solenoid 30. The solenoid is spring loaded and when the solenoid is de-energized the spring serves to press the shaft 28 inwardly so as to cause the operation of the pusher arm. As will be later explained, when a measured quantity of sliced product has been deposited on my measuring and segregating apparatus it causes solenoid 30 to be energized with the result that operating shaft 28 is shifted outwardly causing cessation of operation of the pusher 15.

Control lever 31, mounted on the side of the slicing machine, causes the rapid traverse or shifting of the pusher in either direction. When the lever is in neutral or center position the pusher reciprocates normally. When it is desired to shift the pusher rapidly in a forward direction the lever is shifted forwardly towards the blade and when it is desired to cause the pusher to shift in a rearward direction the lever 31 is shifted away from the blade.

A suitable feed control 32 is also provided on the side of the machine. Rotation of the control knob in one direction causes the speed of the pusher in a forward direction to be increased and rotation of the knob in the opposite direction similary causes the feed of the pusher in a forward direction to be decreased.

*Hydraulic circuits for the slicing machine*

The hydraulic circuits for causing the reciprocation of piston 27 in cylinder 26 and whereby the various controls 29—32 are caused to operate are shown in Fig. 7. Thus, the hydraulic pump 25 pumps the hydraulic fluid from the supply tank (not shown) through line 34 and thence through tube 35 to the main on-and-off control valve 29. When the operating shaft 28 is pressed inwardly the valve is open to permit fluid pressure through line 36 to the spring centered reversing valve 37. In addition to flowing to the spring centered reversing valve, oil from line 36 passes through the T-coupling 38 through line 39 to the pilot valve 40. Oil entering the reversing valve 37 may leave through line 41 to the forward end of cylinder 26 to cause the pusher to retract away from the blade or it may leave through line 42 so as to enter the rear of cylinder 26 and thereby cause the pusher to feed forwardly towards the cutting blade.

Pilot valve 40 controls the reversing valve 37 so as to determine whether the hydraulic fluid will exit through the line 41 or the line 42. The pilot valve 40 in turn is controlled by the reciprocation of the pusher. Thus, the lever arm 43 which controls the position of the pilot valve 40 through interengagement with the finger lever 44 is pivotally mounted to the frame at 45 and to the pilot control rod 46 at the point 47. The pilot rod 46 is longitudinally reciprocal and has a pair of adjustable collars 48 near the opposite limits of movement of the pusher which are engaged by the arm 49 at the two extreme limits of movement so as to shift the pilot rod 46 in the direction of movement of the pusher. Thus, when the pusher is shifted to the right, pilot rod 46 will shift to the right when arm 49 engages collar 48 thereby pushing the arm 43 to the right and rotating pilot valve 40 to the position shown in full lines in Fig. 7. When the pilot valve is in this position the hydraulic fluid coming through line 39 is blocked by the pilot valve and cannot exit through line 50 to the control portion 51 of reversing valve 37. Under those circumstances the spring centered reversing valve 37 is in its centered position and causes the hydraulic fluid entering the reversing valve 37 to exit through line 42 to the rear portion of the hydraulic cylinder with the result that the piston and pusher are fed towards the cutting blade.

When the pusher shifts to the desired forward limit of movement, arm 49 will engage the other collar 48 shifting the pilot rod 46 to the left with the result that arm 43 is pivoted to the left causing the pilot valve 40 to assume the position shown in dotted lines. Under those circumstances, the pilot valve is opened to permit flow of the hydraulic fluid under pressure through line 39, pilot valve 40, line 50 to the control portion 51 of reversing valve 37. The hydraulic pressure from line 50 entering the control portion 51 shifts the control inwardly against the force exerted by the spring with the result that hydraulic fluid from the reversing valve exits through the line 41 and enters the forward end of the hydraulic cylinder 26 causing the piston and pusher to shift rearwardly away from the blade.

This cycle of operation with automatic reversing continues so long as control valve 29 remains open. The speed at which the pusher shifts in a forward or feeding direction is controlled by feed control 32. Thus, as the piston 27 in cylinder 26 is shifted to the left as viewed in Fig. 7, the hydraulic fluid in the forward part of the cylinder must exit through line 41. Reversing valve 37 is so constructed that the fluid leaving the cylinder through line 41 cannot pass through the reversing valve when it is centered, but must flow through line 52 to the feed control valve 53. By rotating the feed control dial 32 the size of a pressure balanced orifice opening in the feed control valve can be increased or decreased so as to increase or decrease the flow of hydraulic fluid outwardly through line 54 and back to the reservoir or supply tank. By enlarging the opening, it will be appreciated that the speed of the feed is increased. By decreasing the size of the opening the speed of the feed is decreased. Control valve 29 is connected by a line 55 to feed control 53. The control valve 29 permits the fluid pressure to pass through the line when the valve 29 is closed. This maintains a constant pressure in the feed control valve 53 so as to prevent any lag and a resultant increase in the size of the slices upon each reversing in the direction of movement.

Feed control valve 53 does not serve to control the speed of the pusher in a rearward direction. When piston 27 shifts in cylinder 26 to the right, as viewed in Fig. 7, the hydraulic fluid to the right of the piston exits through line 42 and is permitted to flow through reversing valve 37, when the control has been shifted inwardly by fluid pressure at 51, the fluid flows outwardly to return line 56 from which it re-enters the reservoir of supply tank.

When control lever 31 is pivoted rearwardly through the action of cranks 58 and 59 it causes reversing valve 37 to assume the same position as when fluid pressure is applied to the control portion 51. In other words, it causes fluid under pressure to pass through the reversing valve and thence through line 41 to the forward portion of cylinder 26. The hydraulic fluid at the rear of the cylinder can leave through line 42 and thence pass through reversing valve 37 and through return line 56 to the reservoir.

When the lever 31 is pivoted forwardly or to the left as viewed in Fig. 7, it causes the fluid under pressure to pass through reversing valve 37 and line 42 to the rear portion of cylinder 26. The fluid returning from the forward portion of the cylinder through line 41 need not pass through the feed control valve 53 but can now pass through reversing valve 37 through return line 56 to the reservoir. This permits the pusher to travel at a much greater rate of speed.

A relief line and valve 60 is provided between the end of the hydraulic pump 25 and the reservoir so as to prevent too much pressure from building up in the hydraulic system. The relief valve can be adjusted to the desired pressure as, for instance, 150 pounds.

The slicing machine and the hydraulic control circuits, as shown in Figs. 4, 5, 6 and 7 and as described above, are illustrative of the type of device to which my measuring and segregating apparatus may be applied. As stated above, the slicing machine is commercially available and does not per se constitute my invention.

*Measuring and segregating apparatus*

My improved measuring and segregating apparatus is shown primarily in Figs. 1 to 5 inclusive. It comprises a supporting table 70 on which is mounted a receiving platform 71 and a conveyor 72 in intermeshed relationship with each other and vertically shiftable with respect to each other so that they may shift relative to each other between normal operating position, as shown in Figs. 2 and 3 with the receiving platform 71 disposed in a higher horizontal plane than the conveyor and a segregating position as shown in Fig. 5 with the conveyor in a relatively higher horizontal plane than the receiving platform. Under this arrangement, sliced products coming from the slicing machine are discharged onto the receiving platform which is normally in a higher horizontal plane.

Suitable measuring means are provided, such as a weighing scale, and when the desired measured quantity of sliced products have been deposited on the receiving platform, then the measuring means through suitable electrical control circuits causes the receiving platform and the conveyor to change their relative positions so that the conveyor is in a relatively higher horizontal plane and engages the undersurface of the sliced products shown at 73 in Fig. 5 and conveys them away from the platform segregating them from other sliced products discharged by the slicing machine. The measuring device also causes the energization of solenoid 30 closing the control valve 29 and stopping the further operation of the feed mechanism for feeding the product to be sliced towards the slicing blade.

Through suitable timing mechanism the conveyor remains in a relatively higher plane until the sliced products have been transported away from the receiving platform and the feed mechanism of the slicing machine is kept inactive for the same period. When the sliced products have been transported away by the conveyor and duly segregated, the parts then assume their normal operating position with receiving platform in a relatively higher position than the conveyor. At the same time, the solenoid 30 is de-energized with the result that the control valve 29 is again opened permitting the feed mechanism to resume its normal operation.

In the specific embodiment of my invention shown in Figs. 1 to 5 inclusive, the receiving platform 71 is in the form of a ribbon conveyor consisting of a plurality of laterally spaced, endless belts 74 made of stainless steel strips or other suitable material and extending between the pulleys 75, 76. The pulleys 75, 76 are, in turn, journaled at one end only in the relatively elongated bearings 77, 78 carried on the frame 79. The frame is, in turn, supported by standards 80 on the platform of the scale 81 fixedly mounted on the table which, in the illustrated embodiment, forms part of the measuring apparatus used for measuring the desired predetermined quantity of sliced food product although, as stated above, other types of measuring apparatus may be employed.

The scale shown in the drawings is of the over-and-underweight type which is adjusted to the desired predetermined weight. The scale has a dial or face 82 with a fixed pointer 83 pointing downwardly at the center thereof. A movable pointer 84 is adapted to shift across the face of the dial. The scale may be adjusted to weigh any desired predetermined weight. The movable pointer 84 normally remains at one side of the dial face until the weight or load applied to the platform of the scale reaches the predetermined weight to which the scale has been adjusted and then the pointer shifts to the center of the scale immediately opposite the fixed pointer 83. It will be appreciated that the platform of the scale carries the weight of the receiving platform 71 and its supporting pulleys and frame. The weighing scale is adjusted to compensate for the weight of the platform and associated parts and to the desired predetermined weight of the sliced products to be segregated and wrapped.

When the slices are discharged onto the receiving platform the weight gradually builds up until the movable pointer 84 is caused to shift to the center of the dial face. When the pointer thus moves to the center of the dial face it is caused to actuate the electrical circuits which, in turn, cause the feed mechanism of the slicing machine to stop operation and also cause the relative positions between the receiving platform and conveyor to change.

Any suitable switch mechanism may be used for this purpose as, for instance, the light beam source 85 located at one side of the dial face opposite the center thereof and focused through the dial face on the electric eye 86 on the opposite side of the dial face at the center thereof. When the pointer 84 shifts to the center of the dial face it interrupts the light beam thereby permitting current to flow through the electric eye to actuate the control circuits. Instead of the electric eye and light beam other suitable switch mechanism such as that shown in Fig. 9 may be employed in which a normally open single pole micro switch or mercury switch 87 of known design is actuated when frame 79 shifts downwardly sufficiently to engage switch actuator 88 permitting current to flow through the switch to the control circuits.

Conveyor 72 is likewise a ribbon conveyor and consists of a plurality of parallel, laterally spaced, endless belts 89 positioned between the belts 74 of the receiving platform. The leading or forward end of the belts 89 extend around the pulleys 90 and thence downwardly around the pulleys 91 spaced vertically below the pulleys 90. The pulleys 90 and 91 are journaled on shafts which, in turn, extend between the two sides of a frame 92 which are vertically shiftable in track-like supports 93. By shifting the frame 92 and the pulleys 90 and 91 upwardly the upper surface of the conveyor, at its leading end, can be shifted from a plane disposed beneath the plane of receiving platform 71 to a plane positioned above the receiving platform.

The upper flight of the endless ribbons or belts 89 extend between the pulleys 76 and thence outwardly from the receiving platform in an axial direction. The lower flight of the endless ribbons or belts 89 extend around the lower pulleys 91 and thence diagonally upwardly to another roller or set of pulleys (not shown) at the end of the conveyor.

The ribbon conveyor forming the receiving platform is continuously driven by suitable means, such as electric motor 94, sprocket 95, chain 96 and sprocket 97 connected to the end of the shaft of the pulleys 76. Similar means (not shown) are also provided for continuously driving the endless ribbons or belts of the conveyor 72.

The frame 92 and guide pulleys 90 and 91 are caused to shift upwardly and downwardly by means of motor 98 connected by chain 99 to gear box 100 which through shaft 101 rotates the crank 102 connected to link 103 pivoted to the end of lever 104. The lever is suitably fulcrumed at 105 to a bracket 106 mounted on the supporting table and the opposite end of lever 104 is pivoted at 107 to the lower portion of frame 92.

When the crank is in the position shown in Fig. 3 the right-hand end of lever 104 is shifted to its uppermost position with the result that frame 92 and the leading end of conveyor 72 are shifted downwardly to a plane beneath the plane of receiving platform 71. When the crank 102 is rotated to the position shown in Fig. 5 then the right-hand end of lever 104 is pivoted downwardly causing frame 92 and receiving platform 71 to shift upwardly so that the leading end of the conveyor is positioned in a plane above the receiving platform.

Motor 98 is caused to operate to shift the frame 92 from the position shown in Figs. 2 and 3 to the position shown in Fig. 5, when the measuring device, which in this case includes scale 81, measures the desired predetermined quantity of sliced product on the receiving platform.

*The electrical control circuits*

The electrical cricuits whereby the measuring device causes the relative shifting between the conveyor and receiving platform and causes the interruption of the operation of the feeding mechanism is shown in Fig. 8.

In addition to the electrical circuits, Fig. 8 shows schematically, the related mechanical parts. Thus, the figure shows the receiving platform 71, the conveyor 72, scale 81, light beam source 85, photoelectric cell 86, frame 92 for supporting the leading end of the conveyor and motor 98 and the interconnected mechanism for elevating the frame and conveyor.

The two leads 108 and 109 are connected to the two sides of a source of electric power. It will be seen that the photoelectric cell 86 is connected in series with the winding 110 of relay 111. It should be understood, of course, that if another switch is used in place of the photoelectric cell, such as micro-switch or mercury switch 87, it may be connected in the circuit in the same manner as shown in Fig. 9. Thus, when the pointer of scale 81 intercepts the light beam from source 85, current will flow through the photoelectric cell and energize relay 111 with the result that the movable contact 112 will be shifted from its normal position in engagement with fixed contact 113 to its energized position in engagement with fixed contact 114. When the movable contact shifts from fixed contact 113 the winding 115 of relay 116 is de-energized. Relay 116 is of the type which is open when energized and closed when de-energized. Accordingly, when relay 116 is de-energized movable contact 117 is shifted into engagement with fixed contacts 118 and 119 thereby energizing the winding 120 of relay 30. As shown in Figs. 6 and 7 relay 30 controls valve 29 which, in turn, controls the operation of pusher 15 of the feed mechanism. When solenoid 30 is energized it causes control rod 28 to shift outwardly closing valve 29 which interrupts further flow of the hydraulic fluid to the hydraulic cylinder 26. Therefore, it will be seen that when the desired predetermined weight has been registered on the scale, solenoid 30 will be immediately actuated to cause interruption of the operation of the feed mechanism of the slicing machine.

Returning now to relay 111, it will be seen that when movable contact 112 shifts from fixed contact 113 to fixed contact 114 it closes the circuit of motor 98 which through the interconnecting operating mechanism causes the supporting frame 92 and the leading end of conveyor 72 to shift upwardly from the position shown in full lines to the position shown in dotted lines. When the conveyor shifts upwardly it engages the under surface thereby removing the weight of the sliced products from scale 81. The result is that the light beam again focuses upon photoelectric cell 86 and relay 111 is de-energized.

To insure the continued interruption of the feed mechanism of the slicing machine until the sliced products have been conveyed away by the conveyor and until the conveyor and receiving platform have resumed their normal operating positions, I provide a switch 121 having a movable contact arm 122 disposed in the path of movement of member 123 projecting from the supporting frame 92. As the frame is shifted upwardly by motor 98, member 123 engages the movable contact arm 122 shifting it out of engagement with fixed contact 124 thereby breaking the connection between lead 108 and winding 115 of relay 116. Relay 116 will thus remain de-energized until the conveyor resumes its normal operating position with the result that solenoid 30 will remain energized holding the feeding mechanism of the slicing machine inactive.

I also provide suitable mechanism for causing motor 98 to return the frame and conveyor to their normal operating positions since it will be appreciated that the de-energization of relay 111 opens the circuit of motor 98. For this purpose, I provide another movable contact arm 125 in the path of movement of projecting member 126 carried by supporting frame 92. Switch 127 is normally open. When motor 98 shifts frame 92 and conveyor 72 upwardly, member 126 engages arm 125 at about a point half-way up and shifts it into engagement with fixed contact 128 thereby energizing the timer or delayed action relay 129. Inertia carries the conveyor to a plane above the scale conveyor.

Relay 129 may be adjusted so as to vary the delay in its operation. It should be adjusted so as to provide sufficient time lag to permit the conveyor to remain in elevated position long enough to convey the predetermined quantity of sliced products accumulated thereon away from the receiving platform. After the time lag has elapsed, the shiftable contact 130 of relay 129 is shifted into engagement with the fixed contacts 131, 132 so as to again complete the circuit to motor 98 with the result that the motor runs, shifting frame 92 and conveyor 72 downwardly about one-half its travel. Inertia carries the conveyor to its normal operating position in a plane below the plane of receiving platform 71. At this point, relay 129 is again de-energized through the opening of switch 127 with the result that the circuit of motor 98 is broken. At the same time switch 121 is again closed causing the energization of relay 116 which, in turn, de-energizes relay 30 causing control valve 29 of the slicing machine feed mechanism to open. The feeding mechanism again feeds the product to be sliced to the slicing machine with the result that the sliced products are again discharged upon the receiving platform which, as stated above, is once again in a higher horizontal plane than the conveyor.

*Operation*

My improved apparatus 10 is combined with a slicing machine 11 at the discharge end thereof so that the sliced products coming from the slicing machine are discharged on the receiving platform 71. The control switch of the apparatus (not shown) is turned on so as to cause the continuous operation of the ribbon conveyors forming the receiving platform 71 and the conveyor 72.

The speed of operation of the receiving platform is coordinated with the slicing machine so that the sliced products being discharged are properly arranged on the receiving platform when they are discharged from the slicing machine. Thus, in the case of sliced bacon it is desirable that the bacon slices be deposited on the receiving platform in overlapping or "shingled" fashion.

The product to be sliced is then placed in the slicing machine and the slicing machine is operated so as to cause the sliced product coming therefrom to discharge onto the conveyor. The measuring apparatus, which in this case is scale 81, is adjusted to measure the desired predetermined quantity of the sliced products to be segregated. When the desired predetermined quantity has been accumulated on the receiving platform 71. The suitable switch mechanism such as the photoelectric cell 86 is operated so as to energize relay 111. When relay 111 is energized it initiates the cycle of operation described above. In other words, the feeding mechanism of the slicing machine is interrupted and frame 92 and conveyor 72 are shifted upwardly until the conveyor is disposed above the receiving platform 71. The conveyor is held in elevated position long enough to convey the sliced products away from the receiving platform at which time it is once again lowered to a position beneath the receiving platform at which point the feeding mechanism of the slicing machine is again caused to operate. The cycle of operation is continuously repeated until the product to be sliced is entirely consumed. As each predetermined quantity of the sliced products is carried away by the conveyor, it is segregated from the other sliced products coming from the slicing machine. An operator may be stationed to wrap each such quantity as it is thus segregated.

It will thus be seen that I have provided improved apparatus for measuring and segregating predetermined quantities of sliced products coming from a slicing machine. My improved apparatus eliminates the time consuming and manual operations heretofore required. The apparatus is sensitive and accurate so that the measured quantities can be held within close tolerance limits but nevertheless it is sturdy so as to give satisfactory performance over a long period of time.

Modifications may be made in the illustrated and described embodiments of my invention without departing from the invention as set forth in the accompanying claims. Thus, it will be appreciated that variations may be made in the measuring device, switching and control mechanism, and in the relative shifting of the receiving platform and conveyor.

I claim:

1. The combination with a slicing machine having a slicing blade and feeding mechanism for feeding products to be sliced into the blade, of apparatus for measuring the sliced products coming from the machine and separating them into segregated measured quantities comprising: a first ribbon type conveyor having means for supporting it adjacent the discharge end of the slicing machine to receive and convey products sliced by the machine; a second ribbon type conveyor having means supporting it adjacent and intermeshed with the first conveyor to convey the sliced products away from the first conveyor, said second conveyor being normally disposed in a plane beneath the first conveyor and being shiftable vertically to a plane above the first conveyor; a weighing scale supporting the first conveyor and operatively connected thereto to operate in response to the sliced product carried thereon; and control means for causing the interruption of the operation of the feeding mechanism of the slicing machine when a predetermined weight has accumulated on the first conveyor and for causing said second conveyor to shift to a plane above the first conveyor to transfer the sliced product accumulated thereon, said control means including means for automatically initiating the operation of the feeding mechanism after it has been interrupted.

2. The combination with a feeding means for feeding products to be sliced to high speed continuously operating slicing means of apparatus for batching products coming from said slicing means into segregated measured quantities comprising: receiving and conveying means for receiving the sliced products from said slicing means; control means operatively connected to said feeding means for interrupting the operation of the feeding means for a sufficient period of time for the receiving and conveying means to operate to convey the sliced products away; and weighing means operatively connected to the receiving and conveying means for causing the operation of the control means when a predetermined quantity of sliced products has been discharged onto the receiving and conveying means, and said control means including means for automatically initiating the operation of the feeding means after it has been interrupted for a sufficient period of time for the predetermined quantity of sliced products to be conveyed away.

3. The combination with a feeding means for feeding products to be sliced to high speed continuously operating rotary slicing means of apparatus for batching products coming from said slicing means into segregated measured quantities comprising: receiving and conveying means for receiving the sliced products from said slicing means; control means operatively connected to said feeding means for interrupting the operation of the feeding means, said receiving and conveying means operating during said interruption of the feeding means to convey the sliced products away; and a weighing scale operatively connected to the receiving and conveying means for causing the operation of the control means when a predetermined weight of the sliced products has been discharged onto the receiving and conveying means, and said control means including means for automatically initiating the operation of the feeding means after it has been interrupted for a sufficient period of time for the predetermined quantity of sliced products to be conveyed away.

4. A weighing device comprising a scale platform, a primary conveyor mounted on said platform, said primary conveyor including a plurality of laterally spaced conveyor belts, said primary conveyor being adapted to receive a plurality of successively deposited slices of material, a secondary conveyor, said secondary conveyor including a plurality of conveyor belts interdigitated between the belts of the primary conveyor, an elevator operable to position said secondary conveyor above or below said primary conveyor, means responsive to a predetermined weight on said primary conveyor to move said elevator to position said secondary conveyor above said primary conveyor, and timing means for maintaining said elevator in a raised position for a predetermined time.

5. A weighing device comprising a scale platform, a primary conveyor mounted on said platform, said primary conveyor including a plurality of laterally spaced conveyor belts, said primary conveyor being adapted to receive a plurality of successively deposited slices of material, a secondary conveyor, said secondary conveyor including a plurality of conveyor belts interdigitated between the belts of the primary conveyor, an elevator operable to position said secondary conveyor above or below said primary conveyor, means responsive to a predetermined weight on said primary conveyor to move said elevator to position said secondary conveyor above said primary conveyor, timing means for maintaining said elevator in a raised position for a predetermined time, and means for inhibiting the deposit of sliced material on said conveyors while said elevator is in a raised position.

6. A weighing device comprising a scale platform, a primary conveyor mounted on said platform, said primary conveyor including a plurality of laterally spaced conveyor belts, said primary conveyor being adapted to receive a plurality of successively applied slices of material, a secondary conveyor, said secondary conveyor including a plurality of conveyor belts interdigitated between the belts of the primary conveyor, an elevator operable to position said secondary conveyor above or below said primary conveyor, a pointer responsive to the weight on said primary conveyor, a light source, a light sensitive device positioned to receive light from said source, said pointer occulting said light source from said light sensitive device in response to a predetermined weight on said primary conveyor, a relay controlled by said light sensitive device, means energized by said relay operable to move said elevator to position said secondary conveyor above said primary conveyor, and timing means for maintaining said elevator in a raised position for a predetermined time.

7. A weighing device comprising a scale platform, a primary conveyor mounted on said platform, said primary conveyor including a plurality of laterally spaced conveyor belts, said primary conveyor being adapted to receive a plurality of successively deposited slices of material, a secondary conveyor, said secondary conveyor including a plurality of conveyor belts interdigitated between the belts of the primary conveyor, means responsive to a predetermined weight on said primary conveyor to move said elevator to position said secondary conveyor above said primary conveyor, said means including a lever, coupled with said elevator, for raising and lowering said elevator and a motor, coupled with said lever, cooperable to actuate said lever and further a scale coupled with said motor, said scale, which includes said aforementioned scale platform, being responsive to the weight received on said primary conveyor for cooperating to energize said motor, and timing means for maintaining said elevator in a raised position for a predetermined time.

8. A weighing device comprising a scale platform, a primary conveyor mounted on said platform, said primary conveyor including a plurality of laterally spaced conveyor belts, said primary conveyor being adapted to receive a plurality of successively deposited slices of material, a secondary conveyor, said secondary conveyor including a plurality of conveyor belts interdigitated between the belts of the primary conveyor, means responsive to a predetermined weight on said primary conveyor to move said elevator to position said secondary conveyor above said primary conveyor, said means including a lever, coupled with said elevator, for raising and lowering said elevator and a motor, coupled with said lever, cooperable to actuate said lever and further a scale coupled with said motor, said scale, which includes said aforementioned scale platform, being responsive to the weight received on said primary conveyor for cooperating to energize said motor, and timing means including switch means cooperable to engage surfaces of said elevator for maintaining said elevator in a raised position for a predetermined time.

9. The combination with a slicing machine having a blade and feed mechanism for feeding products to be sliced to the blade, of apparatus for measuring the sliced products coming from the machine and separating them into segregated, measured quantities comprising: a receiving platform adjacent the discharge end of the slicing machine for receiving thereon the sliced products coming from said slicing machine; a conveyor intermeshed with said receiving platform and being cooperable to convey said sliced products away from said receiving platform, said conveyor and receiving platform being so constructed and arranged to be relatively vertically reciprocal with respect to one another so that said conveyor is adapted to convey the sliced products away from the receiving pltaform; a measuring mechanism responsive to a predetermined quantity of sliced products discharged by said slicing machine; and control means responsive to the operation of said measuring mechanism when the predetermined quantity of sliced products has been discharged by said slicing machine for interrupting the operation of the feeding mechanism and for causing the relative vertical reciprocation of the conveyor and receiving platform, and said control means including means for automatically initiating the operation of the feeding mechanism after it has been interrupted for a sufficient period of time for the conveyor to operate to convey the predetermined quantity of sliced products away from said receiving platform.

References Cited in the file of this patent

UNITED STATES PATENTS

| | | |
|---|---|---|
| 1,535,905 | Dashew | Apr. 28, 1925 |
| 1,729,991 | Bond | Oct. 1, 1929 |
| 1,976,855 | McKee et al. | Oct. 16, 1934 |
| 1,993,586 | Bech | Mar. 5, 1935 |
| 2,047,400 | Walter | July 14, 1936 |
| 2,073,082 | Walter | Mar. 9, 1937 |
| 2,104,546 | Pennell et al. | Jan. 4, 1938 |
| 2,184,905 | Brintnall | Dec. 26, 1939 |
| 2,338,734 | Perry | Jan. 11, 1944 |
| 2,455,433 | Matsen | Dec. 7, 1948 |
| 2,614,786 | Caron et al. | Oct. 21, 1952 |
| 2,744,553 | Folk | May 8, 1956 |
| 2,812,792 | Allbright | Nov. 12, 1957 |
| 2,870,810 | Folk | Jan. 27, 1959 |

FOREIGN PATENTS

| | | |
|---|---|---|
| 251,634 | Switzerland | Aug. 16, 1948 |